United States Patent [19]

Kavanagh et al.

[11] Patent Number: 5,704,701
[45] Date of Patent: Jan. 6, 1998

[54] SPATIAL LIGHT MODULATOR SYSTEM

[75] Inventors: Martin Kavanagh, Dobcross Oldham; Raymond Gordon Fielding, Royton, both of Great Britain

[73] Assignee: Rank Brimar Limited, United Kingdom

[21] Appl. No.: 302,704

[22] PCT Filed: Mar. 4, 1993

[86] PCT No.: PCT/GB93/00456

§ 371 Date: Sep. 27, 1994

§ 102(e) Date: Sep. 27, 1994

[87] PCT Pub. No.: WO93/18620

PCT Pub. Date: Sep. 16, 1993

[30] Foreign Application Priority Data

Mar. 5, 1992 [GB] United Kingdom ............... 9204798

[51] Int. Cl.[6] .......................................... G03B 21/28
[52] U.S. Cl. ............................. 353/33; 353/98; 353/31; 348/771
[58] Field of Search ............................ 353/31, 33, 37, 353/98, 122; 359/212, 223, 846, 847, 849; 348/771, 768

[56] References Cited

U.S. PATENT DOCUMENTS

| | | |
|---|---|---|
| 3,296,923 | 1/1967 | Miles . |
| 4,092,531 | 5/1978 | Moss . |
| 4,743,095 | 5/1988 | Dane . |
| 4,836,649 | 6/1989 | Ledebuhr et al. .......... 353/31 |
| 4,930,864 | 6/1990 | Kuster et al. . |
| 5,098,184 | 3/1992 | van den Brandt et al. ....... 353/102 |
| 5,153,780 | 10/1992 | Jorgensen et al. . |
| 5,168,294 | 12/1992 | Daris et al. ............ 353/97 |
| 5,239,322 | 8/1993 | Takanashi et al. ........ 353/33 |
| 5,245,175 | 9/1993 | Inabata . |
| 5,245,369 | 9/1993 | Um et al. .............. 353/37 |
| 5,260,798 | 11/1993 | Um et al. .............. 348/770 |
| 5,309,188 | 5/1994 | Burstyn .............. 353/33 |
| 5,357,289 | 10/1994 | Kono .............. 353/33 |
| 5,379,081 | 1/1995 | Kim et al. .............. 353/99 |
| 5,386,253 | 1/1995 | Fielding .............. 359/634 |
| 5,420,655 | 5/1995 | Shimizu .............. 353/33 |
| 5,424,868 | 6/1995 | Fielding et al. .............. 348/745 |
| 5,442,414 | 8/1995 | Janssen et al. .............. 348/771 |
| 5,486,881 | 1/1996 | Hwang .............. 353/31 |
| 5,504,629 | 4/1996 | Lim .............. 359/851 |
| 5,506,597 | 4/1996 | Thompson et al. .............. 348/771 |

FOREIGN PATENT DOCUMENTS

WO 92/12506  7/1992  WIPO .
WO 93/15588  8/1993  WIPO .

*Primary Examiner*—William Dowling
*Attorney, Agent, or Firm*—Lerner, David, Littenberg, Krumholz & Mentlik

[57] ABSTRACT

A display apparatus for use in a projection system includes a light source, a beam splitter for splitting light from the source into different color component beams and a deformable mirror device spatial light modulators for each different color beam. The light paths to the beam splitter and modulators are provided within a single prism assembly on which the modulators are mounted.

25 Claims, 9 Drawing Sheets

SPATIAL LIGHT MODULATOR SYSTEM

This invention relates to a spatial light modulator system. Particularly, but not exclusively, this invention relates to a projection system in which a projected display is formed by modulating light from a light source by a spatial light modulator device, and then projecting the modulated light on to a display area. Particularly, but not exclusively, the invention relates to a color spatial light modulator system in which beams having different color content are reflected from different spatial light modulator devices each driven in accordance with a different video signal, and the modulated beams are combined to form a single projected color display.

A spatial light modulator is an optical component which is controllable to modulate an incident light beam. A relatively old example is the eidophor, a layer of oil scanned by a cathode ray. One class of spatial light modulators is active matrix devices, comprising a matrix of individually addressed pixel light valves or modulators; the liquid crystal modulator array described in, for example, EP 0401912 is one modulator array of this type. In EP 0401912, a liquid crystal matrix is provided in a light path to variably transmit, and hence amplitude modulate, the incident light beam (without altering its path or optical axis). Another example of such an active matrix comprises an array of the tiltable mirror devices, for example the deformable mirror device (DMD) described in, for example, U.S. Pat. No. 4,856,863, U.S. Pat. No. 4,615,595, and U.S. Pat. No. 4,596,992.

Such devices comprise miniature mirrored cantilever beam elements carrying electrodes so as to be electro statically deflectable between two positions. The extent of the deflection can be controlled by the applied electrostatic potential to provide variable degrees of reflection, or the device can be operated in a binary manner by applying predetermined electro static potentials to switch between discrete deflection states. It thus angularly deflects the incident light beam and hence changes the optical axis of the light beam.

Using an array of such devices, each individually addressable, a two dimensional image can be reproduced by exposing the array to an incident light beam, modulating the incident beam by controlling the individual mirror devices from a picture signal, and collating the beam reflected in a particular direction. The small size and fast switching times of devices of the kind described in the above mentioned patents makes them usable at video picture data rates, enabling the display of television or video moving images on a display screen onto which the collated beam is projected.

The incident beam is not scanned, as is an electron beam, but illuminates the entire device. In order to display a color image, therefore, it is necessary to provide three separately illuminated deflector arrays, one controlled responsively to each primary color or primary color combinations, and to optically combine the modulated beams reflected from each device onto a single optical display.

One example of an applica on of such a system is in large scale displays as disclosed in U.S. Ser. No. 07/934,503,U.S. Pat. No. 5,386,253, and U.S. Pat. No. 5,424,868 and PCT/GB92/00002 (all of which are incorporated herein by reference).

Various optical systems for spatial light modulator projectors are known from, for example, EP 0401912, EP 363763 and EP 0450952. A projection system which includes liquid crystal arrays is described in EP 0395156. In this system, a lenticular array arrangement of a type also known from, for example, U.S. Pat. No. 3,296,923 is adopted in which light from a light source is made parallel and directed through a first array of lenslets, each rectangular in cross section and curved on one face, from which the light is directed through a second array of such lenslets, the spacing and curvature of the lenslets being such that each of the first lenslets focuses light into the center of a corresponding lenslet in the second array, and then light from the second array is directed through a concentrating lens and thence onto a spatial light modulator array.

The effect of this arrangement is that the initially circular beam of light is transformed into an array of rectangular sub images by the lenticular arrays, which are then combined by a concentrating lens into a single rectangular uniform beam of light suitable for illuminating a rectangular modulator; the transformation from a circular beam to a uniform rectangular beam is achieved without loss of optical power. U.S. Pat. No. 5,098,184 is incorporated herein by reference in its entirety.

The present invention provides, in one aspect, a lenticular reflective array. The array may be curved. Particularly, the reflectors of the array are each concave, so as to concentrate the light. This aspect of the invention is particularly advantageously employed in a spatial light modulator projection system, since by folding the optical path the overall size of the projector can be kept small. Particularly advantageously, the lenticular lens/mirror combination is provided as a surface of a prism.

In another aspect, the invention provides a spatial light modulator system including a spatial light modulator device of the type in which incoming light is modulated in different angular directions depending upon the picture signal applied to the modulator device, further comprising means for absorbing the unwanted light. Advantageously, the means comprises a black glass layer or the like. Particularly advantageously, the absorber converts the light into heat and there is provided a heat sink for carrying the heat away.

In another aspect, the invention provides a spatial light modulator display system in which the light beam is filtered, prior to reaching the spatial light modulator or modulators, to remove non visible components thereof (particularly infrared, and advantageously also ultraviolet). This prevents overheating or chemical degradation of the optical, mechanical or electrical component of the system.

Preferably, the filter comprises a reflecting coating in the path of the light; advantageously, the reflecting coating is provided on a diverging surface, or is otherwise arranged such that rejected radiation does not reflect back into the spatial light modulator device again.

Preferably, the invention is provided for use with spatial light modulator displays of the DMD type and the optical arrangement is generally as described in our U.S. Pat. No. 5,424,868.

Other aspects and preferred embodiments of the invention are as described or as claimed hereafter.

The invention will now be illustrated, by way of example only, with reference to the accompanying drawings in which.

Figure 1:
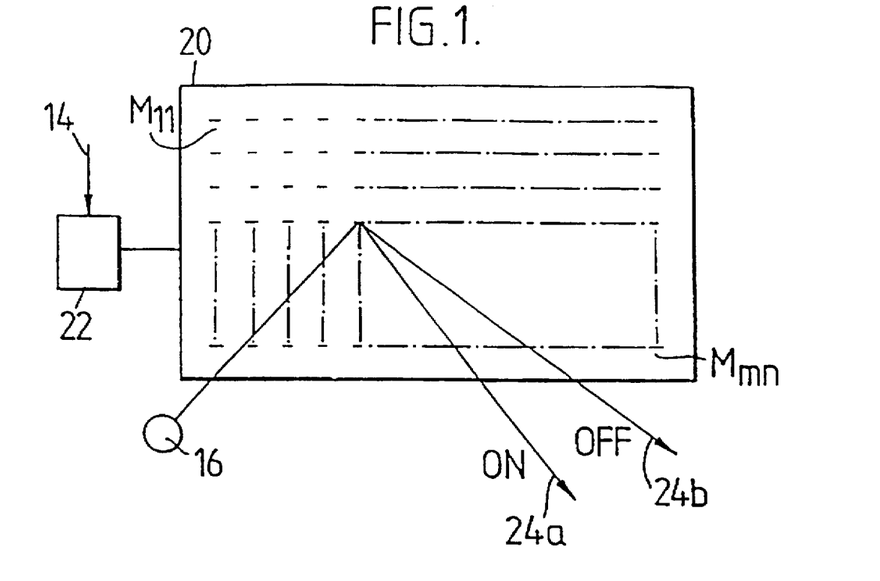
FIG. 1 shows schematically the structure of a spatial light modulator array device in an embodiment of the invention.

Referring to FIG. 1, a deformable mirror device array for use in the invention comprises an array of typically m×n deflectable mirror devices; typically, on the order of 500× 500 devices for a low resolution display or 2000×2000 devices for a high resolution display. The array 20 is connected to an addressing circuit 22 which receives the color signal from the circuit 14, and addresses each of the respective reflectors $M_{11}$–$M_{mn}$, as described in our earlier, International application number PCT/GB92/00002 dated 4 Jan. 1992(Agents ref. 3203299, incorporated herein by reference). Each reflector is thus operated between one of two reflection states corresponding to different reflector positions; an "on" state in which reflected light is directed in a first path 24a and an "off" state in which light is directed in a second path 24b. The second path 24b is disposed to lie away from subsequent optical components of the system. Thus, when viewed alone the "on" path 24a, at an instant, the array 20 displays a two dimensional image, those modulators which are set to a first deflection state appearing bright and those which are set to a second deflection state appearing dark.

Figure 2:
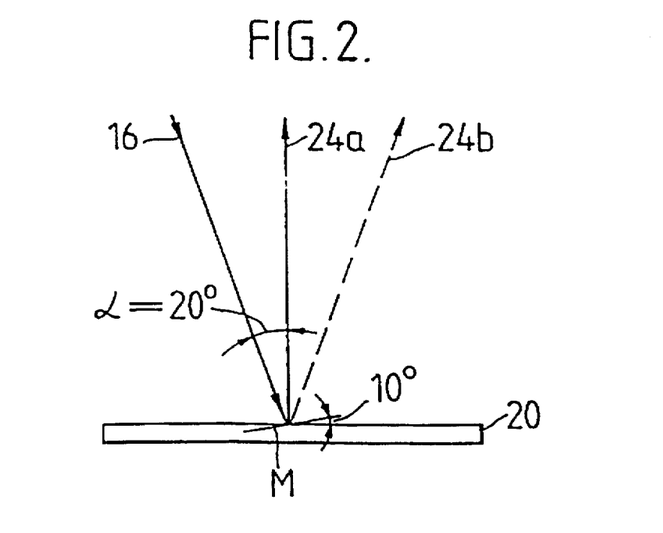
FIG. 2 shows schematically the optical illumination of a portion of the device of FIG. 1.

Referring to FIG. 2, the angle through which each reflector is deflected between the two states is relatively small and thus, in order to achieve good discrimination between the two states the incident light beam from the source 16 is directed towards the array 20 at an angle α (from the normal to the display) of around 20 degrees. When an individual reflector device M is lying parallel to the plane of the array 20, the incident beam is reflected at a corresponding angle of 20 degrees to the normal along path 24b, but when the control signal from the addressing circuit 22 sets the deflector M into a second deflection state at an angle to the plane of the array 20, the incident beam is reflected out along the normal angle to the array on the path 24a.

Figure 3:
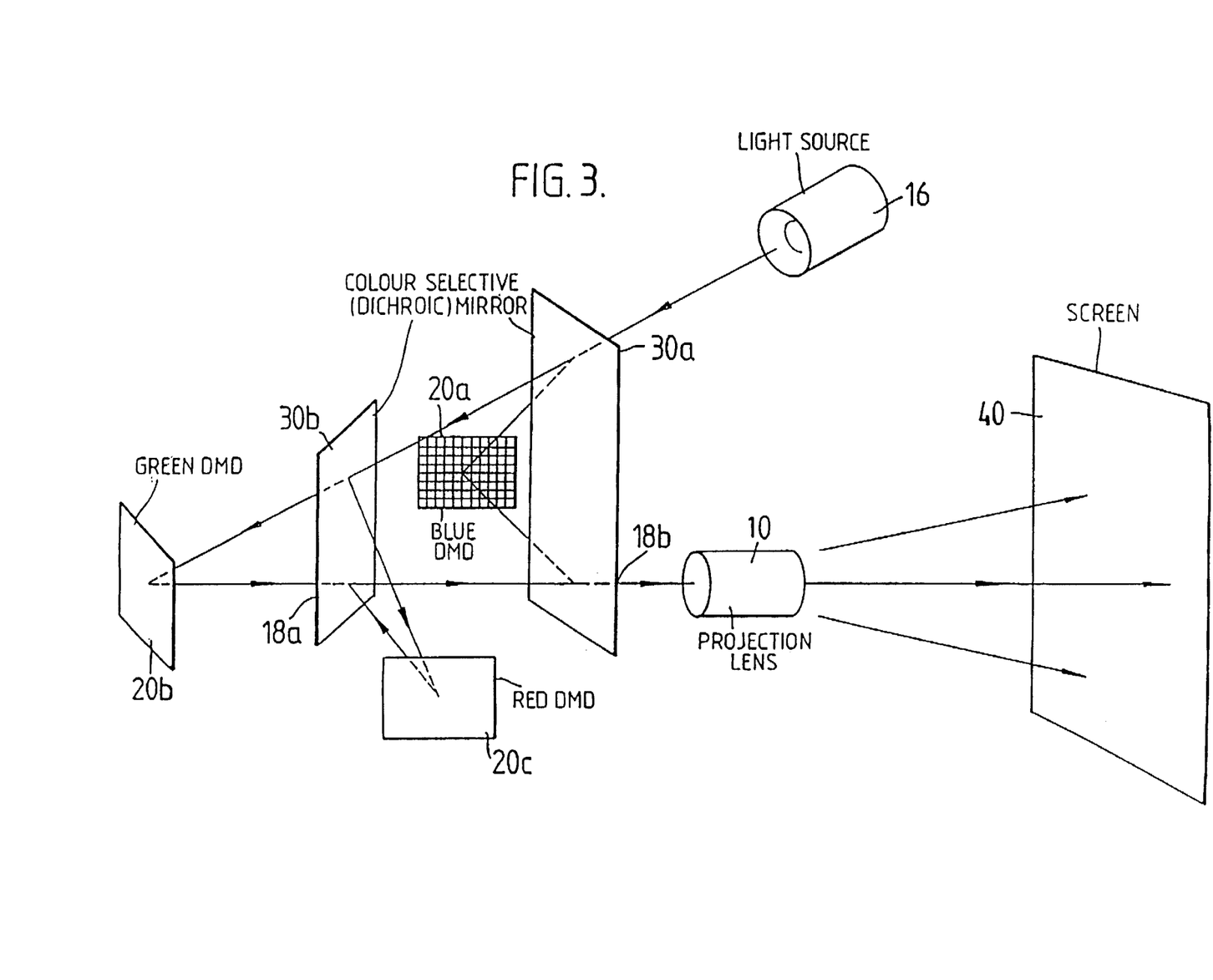
FIG. 3 shows a diagramatic perspective view of a color optical projection display system incorporating the array of FIGS. 1 and 2.

Referring to FIG. 3, a white light source 16 comprising a high power lamp generates light along an incident light path which is for example in a plane normal to that of a display screen 4. For example, the light source 16 may be positioned above the display screen 4. A planar deformable mirror display device 20b is positioned spaced apart from and in a plane parallel to the screen 10, and the light source 16 is arranged to illuminate the array 20b at an angle of 20 degrees to its normal axis. The array 20b is arranged to deflect the incident beam to illuminate the screen 10 via a projection lens 40.

Positioned within the path of the incident and deflected rays are a pair of splitter/combiner mirrors 30a/18b, 30b/18a which are at an inclination, rotated about the vertical axis relative to the plane of the screen by some angle (typically between 20 and 70 degrees, and preferably 45 degrees) such as to reflect the incident beam to further deformable mirror deflector arrays 20a, 20c.

The arrays 20a, 20c are positioned at a distance such that the optical path traversed from each array 20a–20c to the screen 10 is the same. The first splitter/combiner mirror reflects a blue light component beam to a deformable mirror display array 20a which is modulated in response to the blue color component of the picture to be displayed. Consequently, the reflected beam is deflected vertically by 20 degrees but is substantially horizontally unmodified. The splitter 30a transmits red and green wave length components substantially unattenuated.

The second splitter 30b reflects red wave lengths to a second deformable mirror device array 20c which is modulated in response to the red color component signal of the picture to be reproduced and consequently deflected 20 degrees vertically. The second splitter 30b allows the green optical wave lengths to pass substantially unattenuated, to be deflected by a third deformable mirror device array 20b responsive to the green color component signal of the picture to be reproduced.

The modulated green beam passes unattenuated back through both splitter/combiners through the projection lens 10 and onto the screen 4. At the first splitter/combiner reached, 18a, the modulated beam from the red digital mirror device array 20c is reflected into the same path as the modulated green beam and at the second splitter/combiner 30a/18b the modulated signal from the blue digital mirror device array is reflected back into the same path so that the signal at the projection lens 1 comprises the recombined color signals.

Figure 4A:
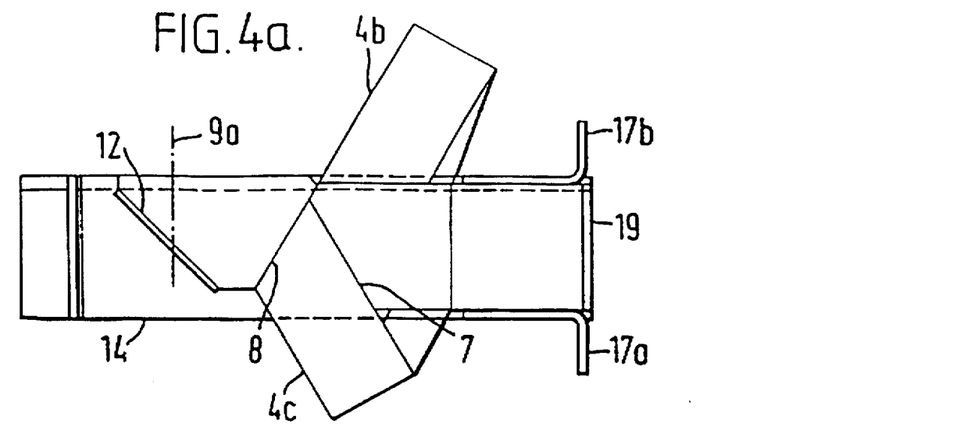
FIG. 4a shows a scaled plan view of an optical assembly for use in the system of FIG. 3.
Figure 4B:
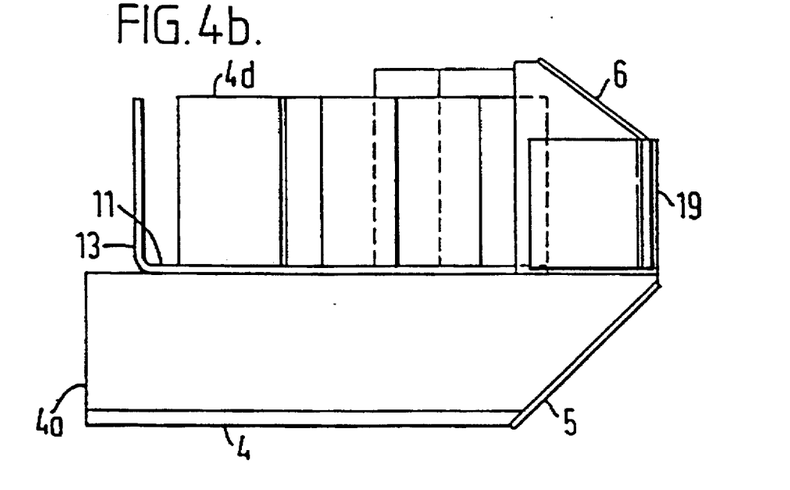
FIG. 4b shows a corresponding side elevation.
Figure 4C:
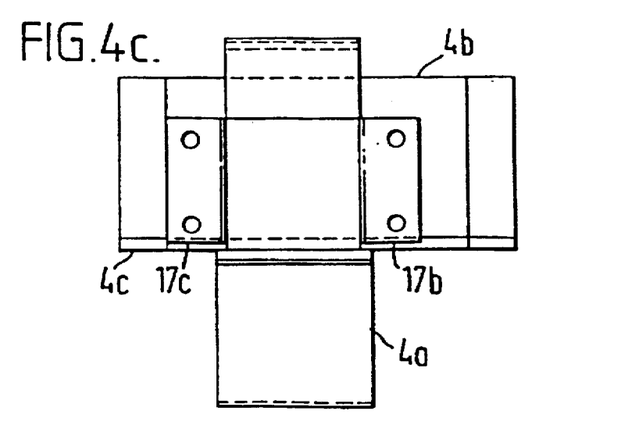
FIG. 4c shows a corresponding end elevation.

Referring to FIG. 4, the mounting of the DMD devices 20a–20c and the splitter/combiner mirror surfaces 30a, 30b is improved by providing a prism assembly 4 integrating the paths to the components. The prism comprises an input portion 4a, to which the beam from the light source 16 is coupled, having at its other end an angled reflecting surface 5 (for simplicity, a 45 degree reflecting surface) redirecting the light beam to a second reflecting surface 6 (again, conveniently at 45 degrees). As shown, the light beam is therefore bent back on itself through a prism portion 4d. An inner prism reflective surface 7 comprises a dichroic splitting/combining surface layer, which reflects blue light and transmits other bands. The reflected blue light passes up an inclined prism portion 4b. At the end face of the prism portion 4b in use carries a DMD device modulated for blue light. The surface 7 thus corresponds to the selective mirror 30a of FIG. 3.

Beyond the splitter/combiner 7, a second dichroic splitter/combiner surface 8 within the prism is positioned; this surface reflects red light down an inclined prism portion 4c on the end face of which a DMD device controlled in dependence upon a red video picture signal is located.

Green light will thus pass through both the surfaces 7 and 8.

A reflective surface 12 (comprising, for example, a total internal reflection surface within the prism or a mirrored surface therein) directs the remaining transmitted green light out of the prism to the position 9a of a third DMD device controlled in dependence upon the red component of a picture.

Mounting brackets 17a, 17b are provided at the front face 19 of the prism; the brackets are to mount the prism assembly to the projection lens assembly 10.

The reflecting surfaces 5 and 6 are arranged to direct the rays from the lamp 16 downwardly at an angle of 20 degrees, for the reasons discussed in our earlier Patent Application PCT/GB92/00132. The splitting/combining surfaces 7 and 8 are inclined at a vertical angle of 10 degrees for reasons discussed in that earlier application, and incorporated herein by reference. The reflecting surface 12 is provided because in the arrangement shown in FIG. 3, the modulated beams from the modulator arrays 20a, 20c are each reflected by a combiner surface whereas that from the modulator 20b is transmitted, and hence the "handedness" of the green image is reversed relative to that of the other two; although it is possible to provide a modulator device 20b which operates in the opposite sense to the other two, it is preferred to provide a further reflection in the path to the green device 20b.

In between the portion of the prism 4d bounded by the reflected surface 12, and from which the portions 4b, 4c branch and the prism portion 4a, a layer 11 of black glass is provided at the boundary with portion 4d and, on the other face of the black glass layer, a copper heat sink 13 is bonded; the heat sink 13 projects out to mount to additional external heat sink components (not shown).

The prism 4 is made of any convenient optical glass; for example, BK7 optical crown glass. The black glass layer 11 has a refractive index matched to that of the prism 4; in the above example, the black glass layer may be type NG1 available from Schott.

Figure 5A:
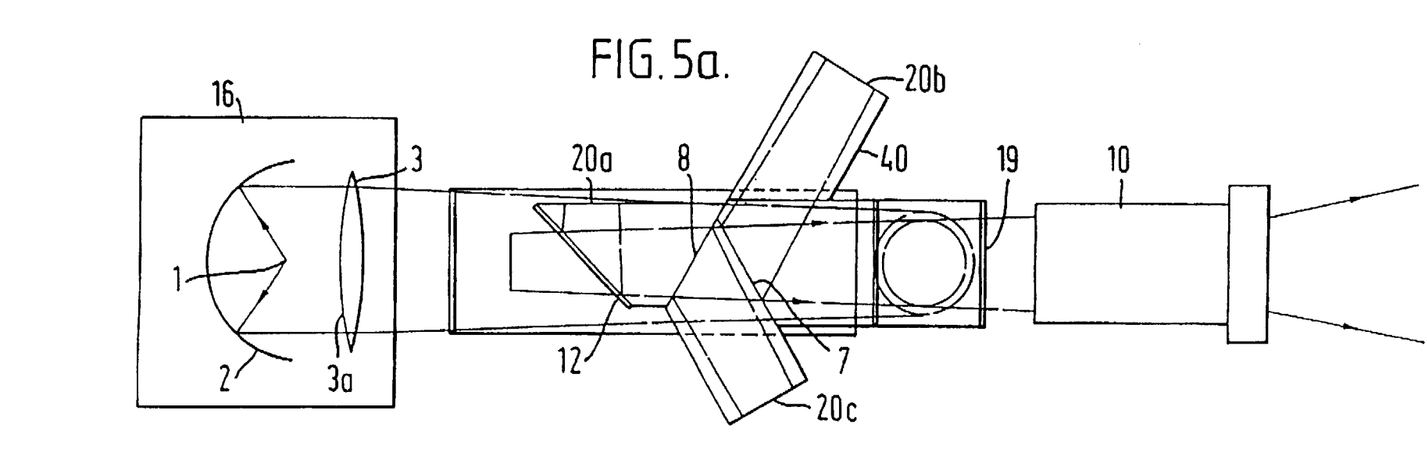
FIG. 5a shows a plan view corresponding to FIG. 4a of the projection system of FIG. 3 including the assembly of FIG. 4.
Figure 5B:
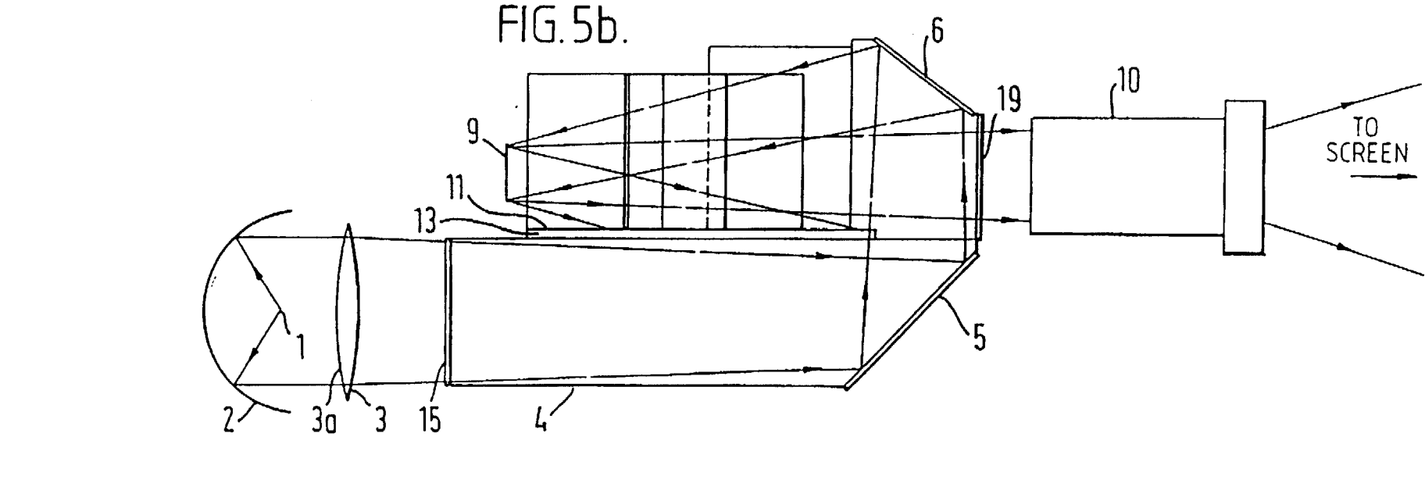
FIG. 5b shows a corresponding side elevation.

Referring to FIG. 5, the lamp 16 may comprise a Xenon arc lamp 1 positioned at the focus of a reflector 2 (for example a parabolic reflector, although an ellipsoidal reflector might be used), which collects the rearward light from the lamp 1. The beam from the reflector 2 is directed through a condenser lens system 3 into the prism 4. The light from the lamp 1 and reflector 2 may contain substantial power in the infrared and ultraviolet frequency bands; the former is undesirable because it heats the optical components, leading to potential misalignment and possibly adversely affecting the mechanical properties of the assembly and the electrical properties of the DMD devices. The latter is undesirable because the prism assembly may comprise a number of components cemented together with an adhesive which the ultraviolet radiation may degrade.

Accordingly, in an embodiment of the invention, the front convex surface 3a of the condenser lens 3 is coated with a coating which transmits visible light but reflects infrared and/or ultraviolet; the advantage of providing the coating on the convex surface 3a is that the unwanted radiation is diffused rather than being focused back on to the lamp 1 and reflector 2, which might otherwise overheat.

Preferably, the front surface 15 of the prism 4 is also coated with a filter coating to further reduce the level of infrared and/or ultraviolet unwanted frequencies; these are then reflected back into the lens 3, from which they are diffused by the lens coating 3a. Examples of such infrared and/or ultraviolet reflecting coatings are well known.

The light beam from the lamp assembly 16 comprises a generally circular section beam, whereas it is desired to illuminate each of the DMD devices 20a-20c with a uniform rectangle of light. In one embodiment the surfaces 5, 6 accordingly provide reflecting apertures, surrounded by light absorbing regions of black glass of the above described type and backed by copper heat sinks (not shown). The shape of the reflecting apertures 5, 6 is not precisely rectangular; each shape is four sided each side being an interpolation between a straight line and a circular arc, in dependence upon the relative distances to the DMD device and the light source, so that the sides of the aperture on the surface 5 are more curvilinear than those on the surface 6 which is nearer to the DMD device. The appropriate shapes are readily derived by considering the ray paths through the prism assembly to each DMD from the lamp 16. The reflective apertures may further be arranged to absorb or transmit unwanted IR or UV wavelengths.

Each DMD device 20a-20c is typically a rectangular array with an aspect ratio corresponding to a desired television picture aspect ratio (e.g. 4:3), and if each is illuminated by a circular beam the edge of which touches the corners of the rectangle, 36% of the light from the beam does not illuminate the rectangle; by providing light absorbing regions on the reflecting surfaces 5, 6, the power in this unwanted light is absorbed prior to reaching the vicinity of the DMD devices and consequently does not cause unwanted heating of the electronic or optical components.

As described with reference to FIG. 3, after reflection and shaping of the beam at the surfaces 5, 6 the blue component of the beam is split at the surface 7 to illuminate the blue DMD 20b, and the reflected beam from those pixels which are in the "ON" state is directed back on a path to the dichroic surface 7 of which it is to be recombined. Likewise, the beam is further split and directed to the red DMD device 20c and green DMD device 20a; in the latter case, when viewed along the prism, the effect is as if the green DMD 20a were positioned at an unreflected point 9 shown in FIG. 5b. Referring to that figure, light from pixels of the green DMD device 20a is therefore transmitted back through the prism portion 4c straight to the surface 19 which the projection lens 10 abuts. However, light reflected from pixels in the "OFF" state (which, for a black picture, will comprise a substantial proportion of the entire power of the beam from the light source 16) is directed to the black glass layer 11 where it is absorbed, and its energy converted to heat which is dissipated by the heat sink 13. This arrangement is therefore of substantial benefit in reducing unwanted heating of the assembly and consequent degradation of its optical, mechanical and electrical properties.

The absorbing layer 11 is positioned so that radiation from pixels in the "OFF" state of the red and blue DMD devices 20b, 20c is likewise directed to the black glass layer 11. In other contructions, of course, separate absorbing layers could be provided for each device.

Referring to FIG. 5b, the path taken by the light from the light source 16 to the projection lens 10 therefore runs forward to the surface 5, sideways to the surface 6, backward to the DMD 20a(or 20b or 20c) and then forward to the projection lens 10; the path is therefore folded back on itself and distance between the projection lens 10 and each DMD device is short, which allows the numerical aperture of the projection lens 10 to be high. On the other hand, the entire assembly is kept compact by the folding of the light path.

Figure 6A:
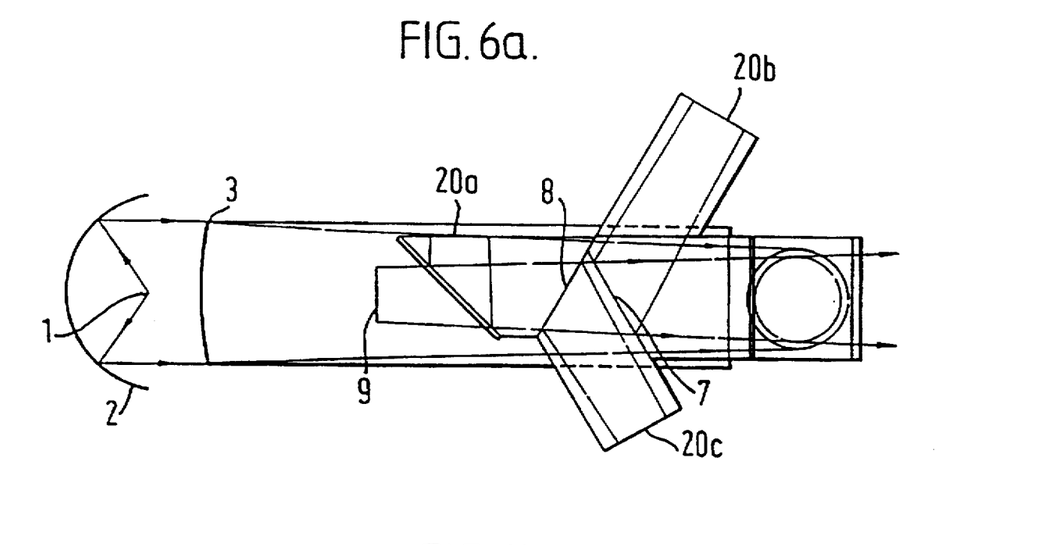
FIGS. 6a and 6b correspond to FIGS. 5a and 5b with the omission of the projecting lens, and show a second embodiment of the invention.
Figure 6B:
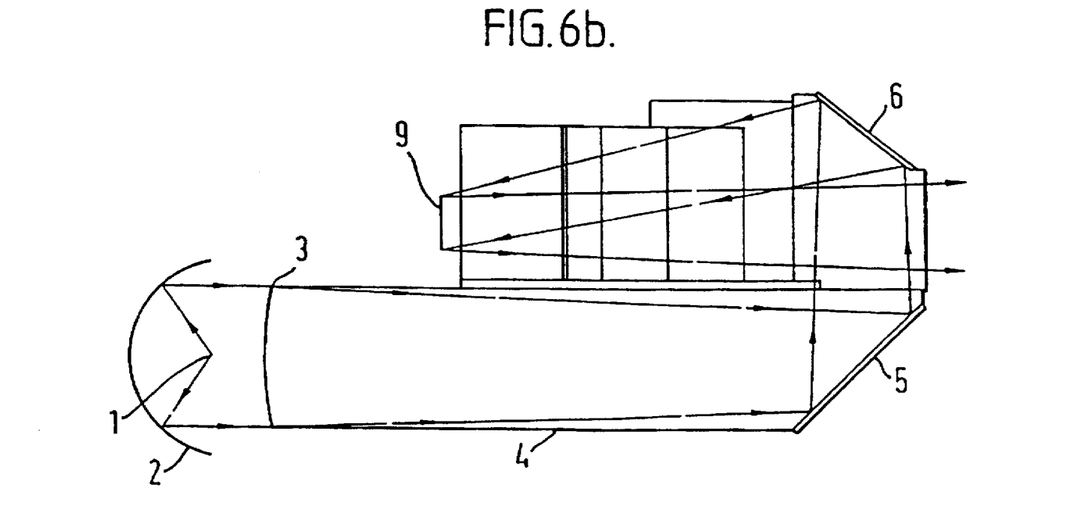

Referring to FIG. 6, the separate condenser lens 3 can be combined with the surface 15 of the prism portion 4a; this reduces the number of optical components, and hence simplifies the task of optical alignment and slightly increases the efficiency of the apparatus by reducing the number of interfaces.

It would equally be possible to change the shape of the reflector 2 to condense the beam from the lamp 1; the object of the condensor is to reduce the aperture of the beam from the lamp 16 to the diameter of the DMD devices.

Figure 7A:
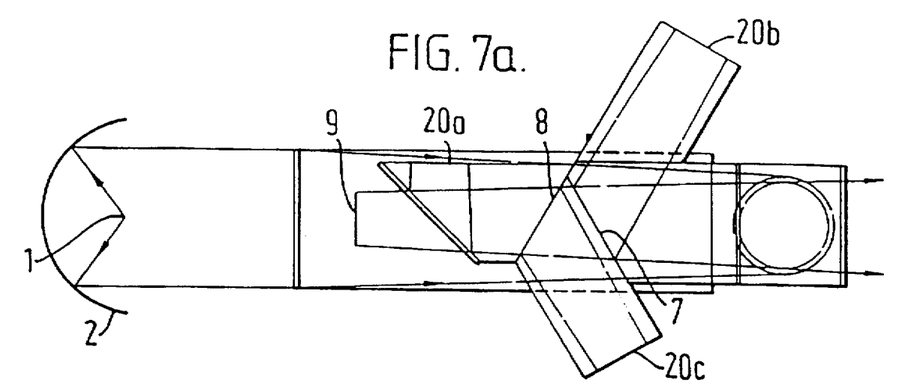
FIGS. 7a and 7b correspond to FIGS. 6a and 6b and show a third embodiment of the invention.
Figure 7B:
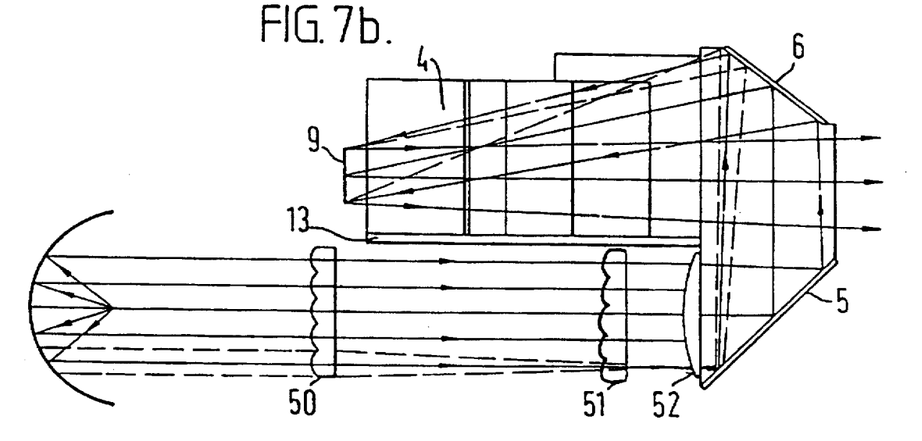

Referring to FIG. 7, in one preferred embodiment of the invention the conversion of the beam shape between a circular section from the lamp 16 and a rectangular section illuminating each of the DMD array devices is performed, as disclosed in U.S. Pat. No. 5,098,184 and the prior art cited therein, by providing a pair of lenslet plates 50, 51 each comprising an array of rectangular lenslets having a curved (e.g. spherical) outer surface. The integrating lens 52 of the arrangement of FIG. 5 of EP 0395156 is conveniently cemented to the face 15 of the prism 4. After passing through both plates 50, 51, the beam comprises a number of uniformly illuminated rectangles, one from each of the lenslets of the array 51; the lens 52 superimposes the rectangles to integrate them into uniform rectangular light beams focused on the DMD devices. The reflector 2 is parabolic, conveniently, to produce a collimated beam falling on the plate 50 but a lens could be provided to do the same job, or any of the optical arrangements of U.S. Pat. No. 5,098,184 could be adopted.

The use of an array of lenses in this way provides a relatively low loss high efficiency conversion of the round beam from the light source 16 into a uniform rectangle.

An alternative arrangement provides the same effect by employing rectangular lenses with crossed axes in combination.

Figure 8:
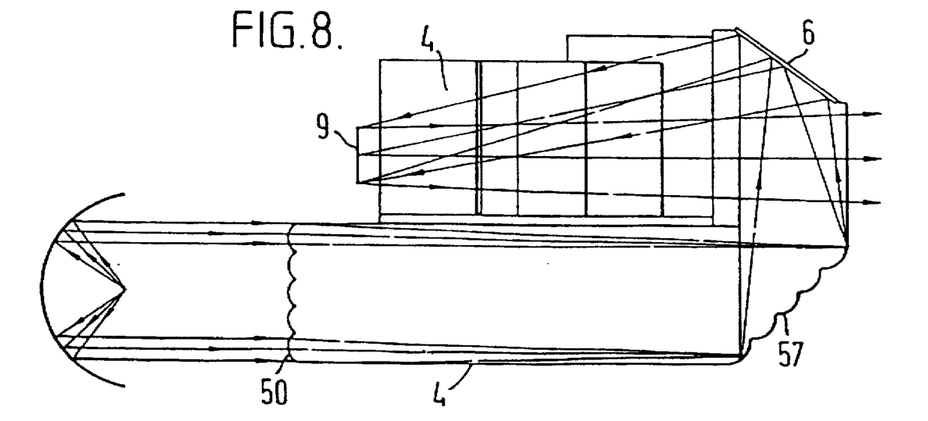
FIG. 8 corresponds to FIG. 7b and shows a fourth embodiment of the invention.

Referring to FIG. 8, in a preferred embodiment the complexity, and associated inefficiency and alignment difficulties, of the arrangement of FIG. 7 is reduced by shaping the front surface of the prism 4 to provide the plate 50 (by grinding or molding the face, or by cementing a plate 50 to the prism). The second plate 51 may be substituted by shaping the reflective face 5 of the prism as shown in FIG. 8 to provide an array of rectangular concave mirrors, combining the functions of the plate 51 with the reflector 5.

The convergence of the beam may be produced either by an appropriately shaped reflector 2, or by providing that the lens array 50 or reflector array 51 is on a curved surface.

Figure 9A:
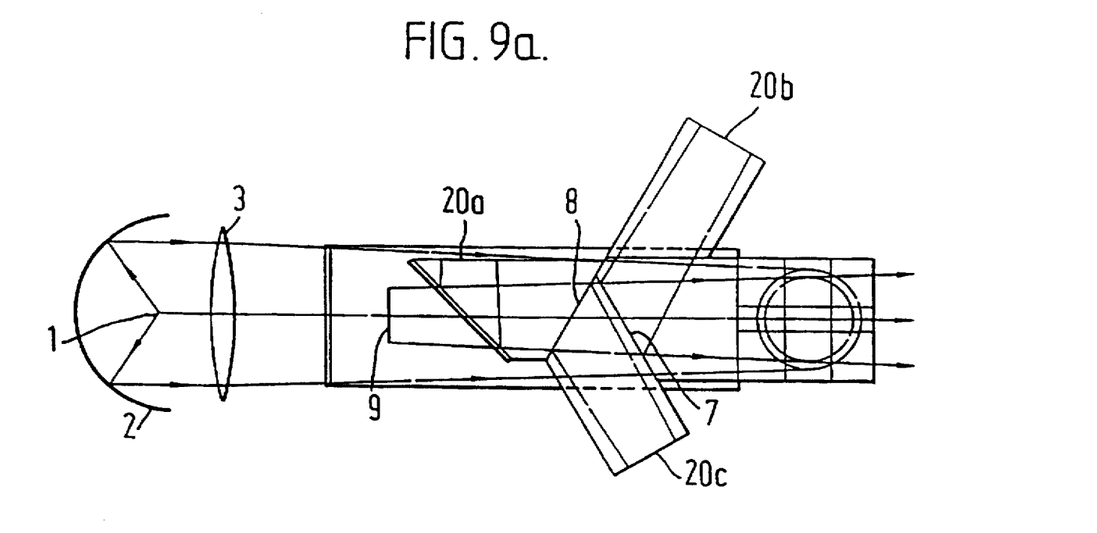
FIGS. 9a and 9b correspond to FIGS. 6a and 6b and show a fifth embodiment of the invention.
Figure 9B:
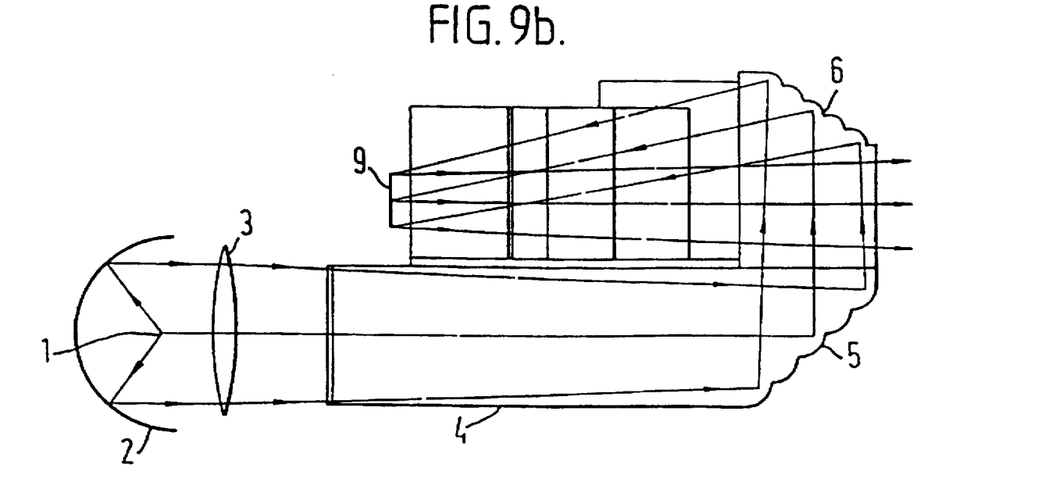

Referring to FIG. 9, in an alternative arrangement, the front lenslet array 50 is also replaced, by providing second concave reflector array at the reflective surface 6. Each reflector of the array 6 comprises a rectangle of the same aspect ratio, but smaller, than the corresponding reflector of the array 5.

Figure 10A:
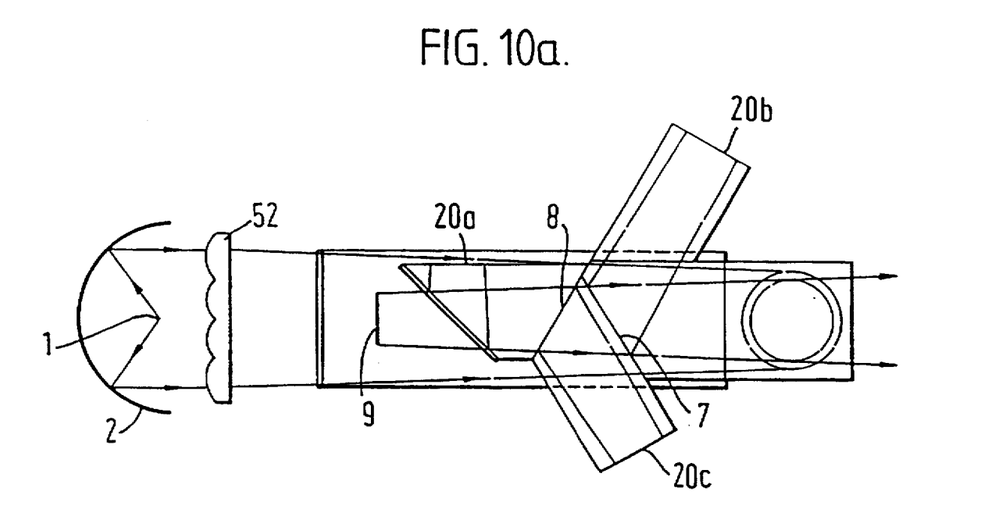
FIGS. 10a and 10b correspond to FIGS. 6a and 6b and show a sixth embodiment of the invention.
Figure 10B:
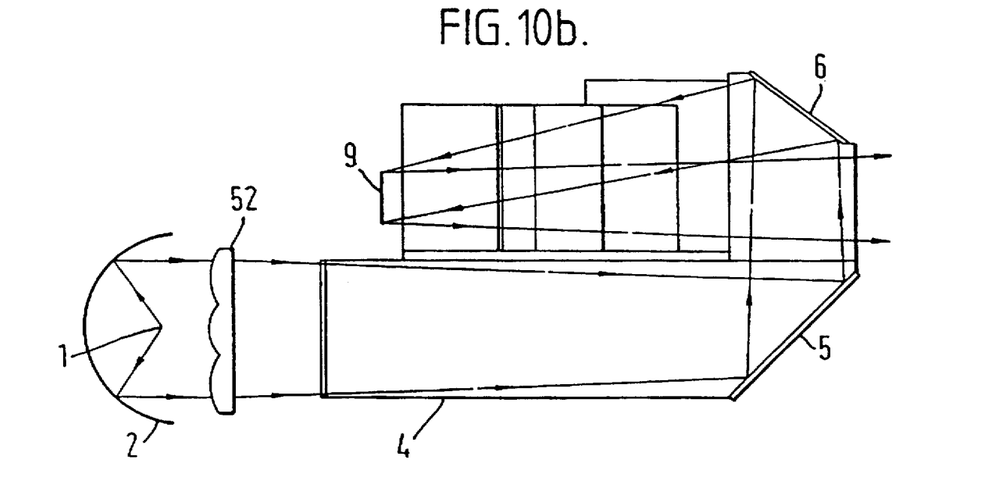

Referring to FIG. 10, in another embodiment of the invention the converging lens 3 and lens plates 50, 51 are combined as a lenticular lens array plate 52 comprising an array of lenslets, as before. However, each lenslet in this case is provided together with (for example, provided on the face of) a prism facet at a facet angle which is normal to the light path at the center of the array 52, but which increases towards the edges of the array. Thus, the light from each lenslet is tilted inwardly towards the center axis of the array 52, by an angle calculated such that when the beam falls on each DMD, the rectangular light beam produced by each lenslet of the array 52 is superimposed to lie on the DMD array. Thus, a single optical component is employed to replace the two lens plates and integrating lens of U.S. Pat. No. 5,098,184.

Figure 11A:
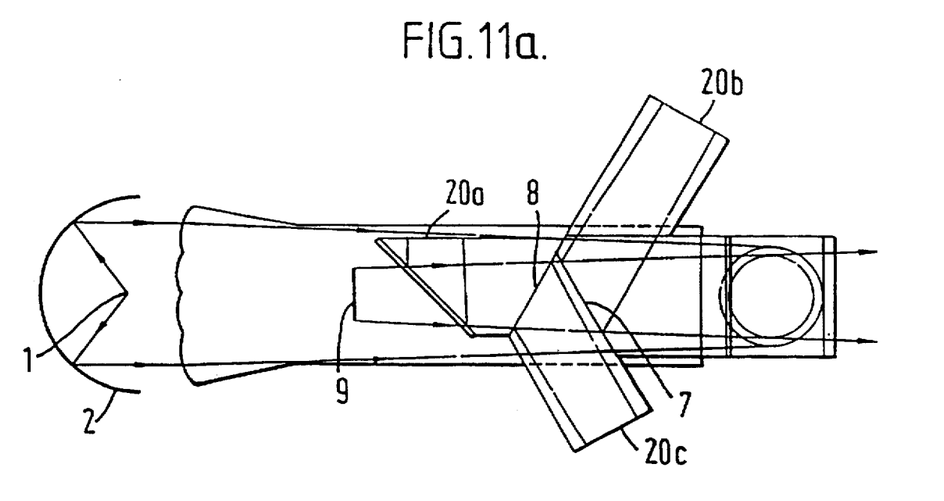
FIGS. 11a and 11b correspond to FIGS. 6a and 6b and show a seventh embodiment of the invention.
Figure 11B:
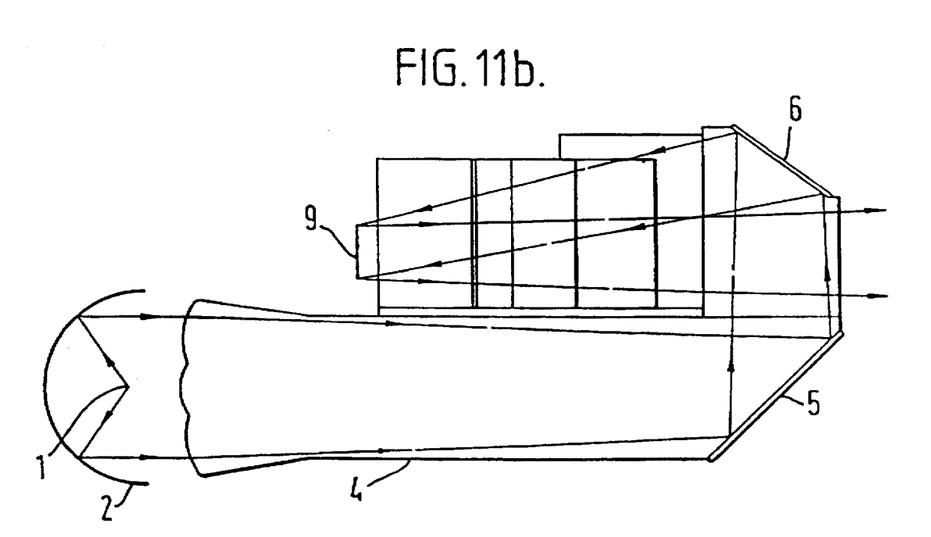

Referring to FIG. 11, in a preferred embodiment of the invention, the complexity of the arrangement of FIG. 10 is further reduced by integrating the plate 52 with the surface 15 of the prism. The advantages of this arrangement are discussed above with reference to FIG. 6.

The arrays of curved reflectors shown in FIGS. 8 and 9 could be provided on a curved surface, to converge or diverge the beam as desired.

The DMD devices 20a–20c are preferably coupled to the prism 4 by a liquid (for example an oil) to reduce interface losses. They are preferably provided with position adjusting mechanisms such as those of our PCT application GB93/00172 which claims priority from our earlier British Application No. 9201810.0(Agents ref. 3203301) incorporated herein by reference.

It will be appreciated that whilst the spatial light modulators described by way of example are of the type in which tilting of the mirror devices is achieved by means of electrostatic deflection of a torsion element, the invention is also applicable to other forms of spatial light modulators comprising an array of tiltable mirror devices each effective to direct an incoming light beam to either an "on" state or an "off" state. Examples of such alternative tiltable mirror devices include devices in which the tilting of the mirror devices is achieved using piezo-electric members, and devices in which the tilting of the mirror devices is achieved using the electrostatic depression of an elastomer.

We claim:

1. A display apparatus for use in a projection system comprising a light source, means for splitting light from the source into different color component beams, and a plurality of spatial light modulators each comprising an array of tiltable mirror devices, characterized in that the light paths to said splitting means and modulators are provided within a single prism assembly to which said modulators are mounted.

2. An apparatus according to claim 1, in which the surface of the prism which receives light from the source is convex so as to converge the light beam onto each modulator device.

3. An apparatus according to claim 1 including light absorbing means positioned to absorb light directed by any of the tiltable mirror devices of the modulators when said tiltable mirror device is in an "off" position.

4. Apparatus according to claim 3, in which the light absorbing means includes means for dissipating heat corresponding to the light absorbed.

5. Apparatus according to claim 3 or claim 4, in which the light absorbing means comprises a layer mounted to a face of the prism and having a refractive index corresponding to that of the prism.

6. An apparatus according to claim 5, in which the layer comprises a black, glass layer.

7. An apparatus according to claim 1 including means for filtering the beam from the light source to reject unwanted spectral components prior to entering the modulators device.

8. An apparatus according to claim 7, in which the filter means are such as to reject infrared components.

9. An apparatus according to claim 7 or 8, in which the filter means are arranged to reject ultraviolet components.

10. An apparatus according to claim 7 wherein the filter means are arranged on a convex surface so as to divergingly reflect said unwanted components.

11. An apparatus according to claim 7 wherein the filter means are arranged so as not to refocus rejected radiation onto the light source.

12. An apparatus according to claim 7 wherein the filter means are arranged on a surface of the prism assembly.

13. An apparatus according to claim 1 including means positioned between the light source and the spatial light modulator, for absorbing portions of the beam which would not illuminate the spatial light modulator.

14. An apparatus according to claim 1 including an optical component comprising a surface defining an array of curved reflectors bounded by polygonal edges, the component being arranged to direct light onto the prism assembly.

15. An apparatus according to claim 14, in which the reflectors are concave.

16. An apparatus according to claim 14 or claim 15, in which the array is curved.

17. An apparatus according to claim 14 further comprising optical means for superimposing the rays from each polygonal reflector of said array onto the prism assembly.

18. An apparatus according to claim 17, further comprising an array of polygonal lenses aligned with said reflective array.

19. An apparatus according to claim 1 including a component for producing a polygonal optical beam comprising an array of polygonal optical lenses or reflectors each said lens or reflector being combined with a prism surface, said prism surfaces being progressively tilted, relative to a point on said array, so as to superimpose the polygonal beams from each said lens or reflector into a single uniform polygonal spot at a predetermined distance from the array.

20. An apparatus according to claim 1 including a spatial light modulator light output system, and an output lens arrangement and a mirror arrangement effective to separate the incident and reflected light to and from said reflective spatial light modulator to reduce the physical distance to the lens, permitting a wide aperture lens.

21. An apparatus according to claim 14, in which the optical component is integral with the prism assembly.

22. A display device comprising a light source, a spatial light modulator for modulating the beam therefrom, and means for projecting the modulated beam to a display, and a prism assembly including a number of discrete components cemented together wherein the component closest to the light source includes means for filtering the beam from the light source to reject unwanted spectral components prior to the spatial light modulator device.

23. A display device which comprises an active matrix spatial light modulator device, including a prism assembly in the light path to the spatial light modulator device, the light modulator device being of the type in which an element of said matrix directs light in a first direction when the element is in a first state and a second direction when the element is in a second state, characterized by light absorbing means positioned to absorb light directed in said second direction of a matching refractive index to that of said prism.

24. An apparatus according to claim 23, wherein the layer of matching refractive index is a black glass layer.

25. A projection system comprising a display device according to claim 23 or 22 and a display.

* * * * *